(12) United States Patent
Myers et al.

(10) Patent No.: US 9,690,334 B2
(45) Date of Patent: Jun. 27, 2017

(54) ADAPTIVE VISUAL OUTPUT BASED ON CHANGE IN DISTANCE OF A MOBILE DEVICE TO A USER

(75) Inventors: Don G. Myers, Rescue, CA (US); Joshua Boelter, Portland, OR (US); Sudip S. Chahal, Gold River, CA (US); David Stanasolovich, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 13/592,301

(22) Filed: Aug. 22, 2012

(65) Prior Publication Data

US 2014/0057675 A1    Feb. 27, 2014

(51) Int. Cl.
| H04M 1/00 | (2006.01) |
| G06F 1/16 | (2006.01) |
| G06F 3/14 | (2006.01) |
| G06F 3/01 | (2006.01) |
| G06F 3/03 | (2006.01) |

(Continued)

(52) U.S. Cl.
CPC .......... G06F 1/1686 (2013.01); G06F 1/1694 (2013.01); G06F 3/012 (2013.01); G06F 3/0304 (2013.01); G06F 3/14 (2013.01); H04M 1/72594 (2013.01); H04N 13/0468 (2013.01); *G09G 2340/045* (2013.01); *G09G 2354/00* (2013.01); *G09G 2370/22* (2013.01); *H04M 2250/12* (2013.01)

(58) Field of Classification Search
CPC ......... G06F 2200/1637; G06F 3/04815; G06F 1/1694; G06F 2203/04806; G06F 3/0346; G06F 3/048; G06F 3/011; G06F 3/012; G02B 2027/0138; G02B 2027/014; G06T 19/006

USPC .............................. 455/556.1, 154.2, 158.4
See application file for complete search history.

(56) References Cited

U.S. PATENT DOCUMENTS 6,317,114 B1   11/2001 Abali et al.
6,400,996 B1   6/2002 Hoffberg et al.
(Continued)

FOREIGN PATENT DOCUMENTS

| KR | 10-2007-0045651 A | 5/2007 |
| KR | 10-2009-0023917 A | 3/2009 |
| KR | 10-2010-0048747 A | 5/2010 |

OTHER PUBLICATIONS

Stanasolovich, David et al., "Adaptive Visual Output Based on Motion Compensation of a Mobile Device," U.S. Appl. No. 13/592,298, filed Aug. 22, 2012, 30 pages.

(Continued)

*Primary Examiner* — Charles Appiah
*Assistant Examiner* — Edward Zhang
(74) *Attorney, Agent, or Firm* — Schwabe, Williamson & Wyatt, P.C.

(57) ABSTRACT

Systems, storage medium, and methods associated with adaptive visual output on a mobile device are disclosed herein. In embodiments, a storage medium may have instructions to enable the mobile device to determine a change in a distance between the mobile device and a user of the mobile device. The instruction may also enable the mobile device to operate an end-user application that may adaptively present a visual output based at least in part on a result of the change in the distance. Other embodiments may be disclosed or claimed.

9 Claims, 6 Drawing Sheets

(51) Int. Cl.
*H04N 13/04* (2006.01)
*H04M 1/725* (2006.01)

(56) References Cited

U.S. PATENT DOCUMENTS

| | | | |
|---|---|---|---|
| 7,401,300 | B2 | 7/2008 | Nurmi |
| 8,099,124 | B2 | 1/2012 | Tilley |
| 8,195,220 | B2 | 6/2012 | Kim et al. |
| 8,279,242 | B2 | 10/2012 | Bentley |
| 8,384,826 | B2 | 2/2013 | Mori et al. |
| 8,423,076 | B2 | 4/2013 | Kim et al. |
| 2002/0083025 | A1 | 6/2002 | Robarts et al. |
| 2002/0151992 | A1 | 10/2002 | Hoffberg et al. |
| 2003/0058341 | A1 | 3/2003 | Brodsky et al. |
| 2003/0067560 | A1 | 4/2003 | Suzuki |
| 2003/0154687 | A1 | 8/2003 | Sugahara et al. |
| 2004/0004616 | A1* | 1/2004 | Konya et al. ............... 345/419 |
| 2004/0119684 | A1 | 6/2004 | Back et al. |
| 2004/0143388 | A1 | 7/2004 | Yano et al. |
| 2005/0058337 | A1 | 3/2005 | Fujimura et al. |
| 2005/0267676 | A1 | 12/2005 | Nezu et al. |
| 2006/0034482 | A1 | 2/2006 | Blonde et al. |
| 2006/0072664 | A1 | 4/2006 | Kwon et al. |
| 2006/0103731 | A1 | 5/2006 | Pilu et al. |
| 2006/0155398 | A1 | 7/2006 | Hoffberg et al. |
| 2006/0171360 | A1 | 8/2006 | Kim et al. |
| 2006/0287819 | A1 | 12/2006 | Brulle-Drews et al. |
| 2007/0041446 | A1 | 2/2007 | Seong et al. |
| 2007/0162537 | A1* | 7/2007 | Juncker ............... 709/200 |
| 2007/0192020 | A1 | 8/2007 | Brulle-Drews et al. |
| 2007/0223808 | A1 | 9/2007 | Kerr |
| 2008/0068487 | A1 | 3/2008 | Morita |
| 2008/0174550 | A1 | 7/2008 | Laurila et al. |
| 2009/0024357 | A1 | 1/2009 | Aso et al. |
| 2009/0051648 | A1 | 2/2009 | Shamaie et al. |
| 2009/0100384 | A1 | 4/2009 | Louch |
| 2009/0179914 | A1* | 7/2009 | Dahlke ............... 345/619 |
| 2009/0186659 | A1 | 7/2009 | Platzer |
| 2009/0201246 | A1 | 8/2009 | Lee et al. |
| 2009/0281721 | A1 | 11/2009 | Yoshioka et al. |
| 2009/0295917 | A1 | 12/2009 | Zhang et al. |
| 2010/0079485 | A1 | 4/2010 | Bentley |
| 2010/0117959 | A1 | 5/2010 | Hong et al. |
| 2010/0118185 | A1 | 5/2010 | Furukawa et al. |
| 2010/0119157 | A1 | 5/2010 | Kameyama |
| 2010/0174421 | A1 | 7/2010 | Tsai et al. |
| 2010/0188331 | A1 | 7/2010 | Wehrenberg et al. |
| 2010/0199213 | A1 | 8/2010 | Suzuki |
| 2011/0035105 | A1 | 2/2011 | Jolly |
| 2011/0035702 | A1* | 2/2011 | Williams ............... G06F 3/0481 715/800 |
| 2011/0046873 | A1 | 2/2011 | Nagase |
| 2011/0084897 | A1 | 4/2011 | Manoharan et al. |
| 2011/0093820 | A1 | 4/2011 | Zhang et al. |
| 2011/0169726 | A1 | 7/2011 | Holmdahl et al. |
| 2011/0190972 | A1 | 8/2011 | Timmons et al. |
| 2011/0200107 | A1 | 8/2011 | Ryu |
| 2011/0298937 | A1 | 12/2011 | Ogawa et al. |
| 2011/0304537 | A1 | 12/2011 | Eruchimovitch et al. |
| 2012/0001843 | A1 | 1/2012 | Gravino |
| 2012/0026197 | A1 | 2/2012 | Li |
| 2012/0032877 | A1* | 2/2012 | Watkins et al. ............... 345/156 |
| 2012/0094700 | A1 | 4/2012 | Karmarkar et al. |
| 2012/0105616 | A1 | 5/2012 | Rios |
| 2012/0116548 | A1 | 5/2012 | Goree et al. |
| 2012/0127319 | A1* | 5/2012 | Rao ............... H04N 5/23206 348/169 |
| 2012/0182429 | A1 | 7/2012 | Forutanpour et al. |
| 2012/0242842 | A1 | 9/2012 | Yoshigahara et al. |
| 2012/0249792 | A1 | 10/2012 | Wilborn |
| 2012/0268568 | A1 | 10/2012 | Lit et al. |
| 2012/0293406 | A1 | 11/2012 | Park et al. |
| 2012/0299864 | A1 | 11/2012 | Tong et al. |
| 2012/0314899 | A1* | 12/2012 | Cohen ............... G06F 3/04815 382/103 |
| 2013/0033485 | A1* | 2/2013 | Kollin et al. ............... 345/419 |
| 2013/0208132 | A1 | 8/2013 | Ryan et al. |

OTHER PUBLICATIONS

International Search Report and Written Opinion mailed Nov. 19, 2013 for International Application No. PCT/US2013/054000, 12 pages.
International Search Report and Written Opinion mailed Nov. 26, 2013 for International Application No. PCT/US2013/054155, 12 pages.
Office Action mailed Feb. 14, 2014 for U.S. Appl. No. 13/592,298, 24 pages.
International Preliminary Report on Patentability mailed Mar. 5, 2015 for International Application No. PCT/US2013/054155, 9 pages.
International Preliminary Report on Patentability mailed Mar. 5, 2015 for International Application No. PCT/US2013/054000, 8 pages.
Final Office Action mailed Jun. 19, 2015 for U.S. Appl. No. 13/5952,298, 28 pages.

* cited by examiner

ADAPTIVE VISUAL OUTPUT BASED ON CHANGE IN DISTANCE OF A MOBILE DEVICE TO A USER

TECHNICAL FIELD

This application relates to the technical field of data processing, more specifically to methods and apparatuses associated with adaptive visual output of a mobile device based on a distance change of a mobile device to a user.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mobile devices may use touch-screen actions to perform user interface functions and to improve and adapt the user experience. A potential downside to touch-screen interaction with applications that are highly visual is the touch controls consume portions of the screen. The act of touching the screen may result in blocking a portion of the screen from the user's view. This blocking may detract from the visual experience and decreases usability of the application, especially on small screen devices where screen real estate is limited. This problem may become more acute as augmented reality applications become more prevalent on mobile devices.

As an alternative to touch interfaces, active proximity, motion detection, and eye tracking systems can be used to detect user actions and perform functions based on these actions.

However high-fidelity detection systems with a nominal range in excess of 50 cm may be complex, expensive, and use an array of active sensors that take space and draw power. Therefore, such devices are not typically available on small portable devices.

The proximity sensors on the current crop of smart phones typically offer a nominal range of at most a few centimeters. Such range may have limited uses, such as to identify whether the phone is held close to the holder's ear, and may be inadequate to support complex user interface decisions when the device is held at an arm's length.

A large commercial game platform, such as the XBOX Kinect, is an example of a non-mobile computer-based system with active motion and proximity sensing. While highly accurate and capable of complex motion tracking, a large commercial game platform may not be very mobile and may be ill-suited for low power mobile use due to cost, size, and power draw.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
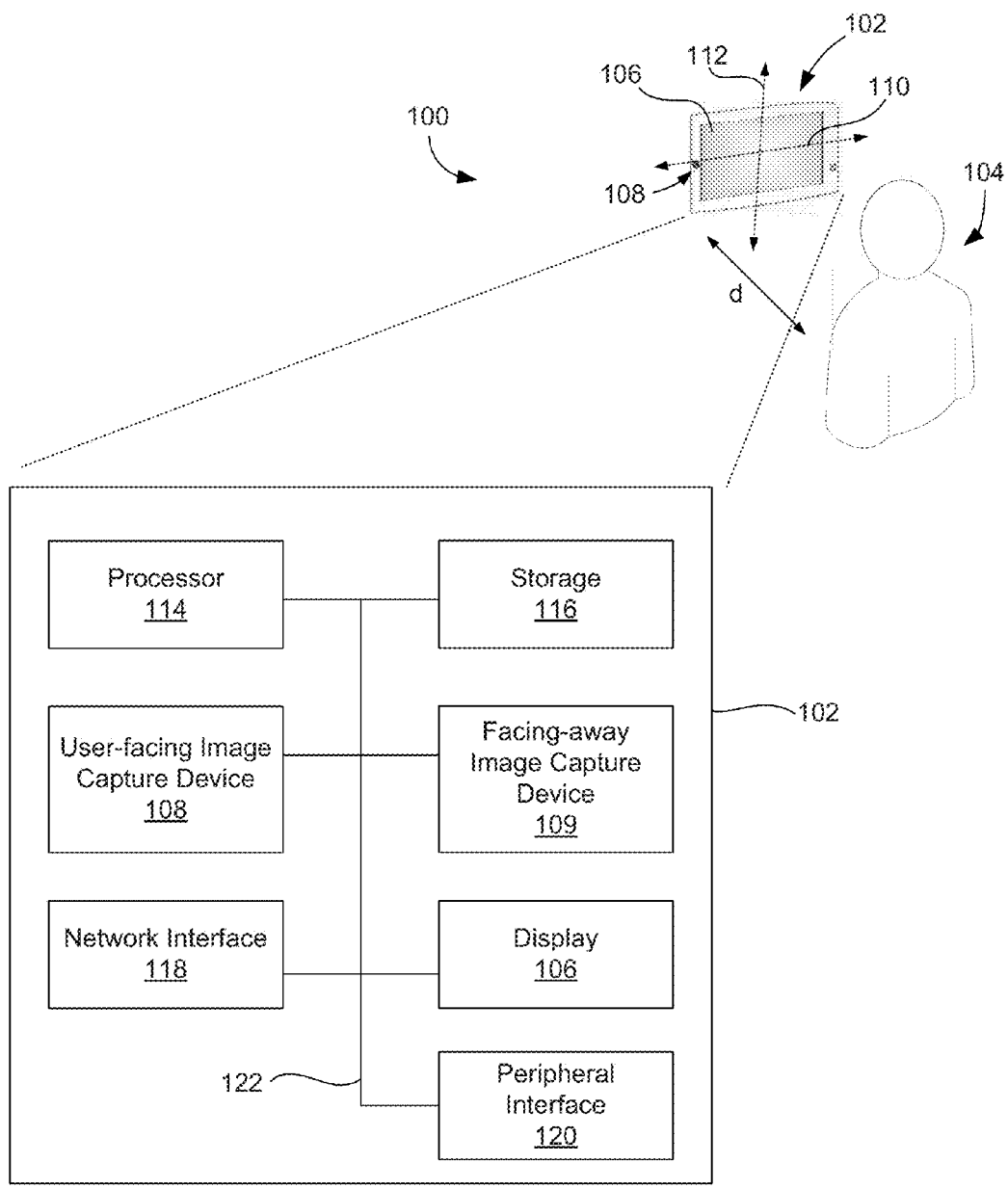
FIG. 1 illustrates an arrangement for adaptive visual output based on change in distance between a mobile device and a user.

FIG. 1 illustrates a perspective view of operating and/or adjusting an application on a mobile device based on a distance of the mobile device to user, and an example arrangement of the mobile device, in accordance with various embodiments. As illustrated, a mobile device 102 may be operated and/or manipulated, by a user 104 in free space 100. Manipulation of mobile device 102 may include changing the position of the mobile device 102.

More specifically, mobile device 102 may be configured to change visual output of mobile device 102, e.g., visual output of an application operating on mobile device 102, based on user 104 moving or changing a position of mobile device 102, which may be characterized in term of a distance (d) between mobile device 102 and user 104. Mobile device 102, in embodiments, may include a display 106 and a user-facing image capture component 108, such as an optical or electromagnetic camera. When mobile device 102 is held by user 104 at a first distance away from user 104, visual output of a first resolution and/or zoom level may be output on display 106. According to various embodiments, mobile device 102 may change the visual output on display 106 to a second resolution and/or zoom level based on a change to a second distance between mobile device 102 and user 104. For example, a mobile device 102 may be configured to increase and/or decrease the resolution or zoom level of a view of another image capture component 109 facing away from the user to correspond to an automatic change in a zoom level of the image capture component 109 in response to changes in the distance d caused by user 104 moving mobile device 102 away from or towards user 104. Mobile device 102, in embodiments, may be configured to determine changes in distance d in response to differences detected in images captured by user-facing image capture component 108.

Mobile device 102, in embodiments, may also be configured to change an orientation of the visual output on display 106 (without changing the orientation of the container of the visual output) based on rotation or displacement of mobile device 102 along an x-axis 110 and/or a y-axis 112. Mobile device 102 may capture images with user-facing image capture component 108 and change the orientation of the visual output on display 106 (without changing the orientation of the container of the visual output) based on differences between the images captured. For example, mobile device 102 may adjust or change the orientation of the visual output of the display 106 (without changing the orientation of the container of the visual output) based on differences in images captured while user 104 rotates mobile device 102 about the x-axis 110. Mobile device 102 may also be configured to adapt or change the orientation of the visual output of display 106 (without changing the orientation of the container of the visual output) based on differences in images captured while user 104 rotates mobile device 102 about y-axis 112. For example, mobile device 102 may rotate a 3-dimensional rendering of an object, in response to rotations of mobile device 102 about x-axis 110 and/or y-axis 112.

Alternatively or additionally, mobile device 102 may adjust or change the panning of visual output of display 106 based on differences between images captured while user 104 laterally or vertically displaces mobile device 102 along x-axis 110 and/or y-axis 112. According to embodiments, laterally displacing mobile device 102 along x-axis 110 and/or vertically displacing mobile device 102 along y-axis 112 may include maintaining an approximately fixed distance d from user 104. In response, the visual output may be adapted to pan left or right, and/or up or down, correspondingly.

Accordingly, in various embodiments, mobile device 102 may adjust or change visual output display 106 by zooming in, zooming out, scrolling up, scrolling down, scrolling to one side or another, rotating or changing a viewpoint of a 3-dimensional (3D) simulation (such as a parallax viewpoint of a 3D image), or the like, in response to movements of mobile device 102. Mobile device 102 may determine differences between captured images by implementing full or partial facial detection, changes in image features, and/or changes in the perspective or angle of images. Mobile device 102 may determine differences between captured images using one or more of a device driver, a system service, and/or an application of mobile device 102.

Advantageously, enabling the adjustment or change of a visual output in response to a change of position and/or orientation of mobile device 102 may enable a user to view all of display 106 while manipulating or using an application on a touchscreen device, without the user's fingers partially blocking display 106. Further, an image based manipulation of an application may provide better accuracy in detection of change of position of mobile device 102 that may not be capable by the employment of sensors, such as an accelerometer.

Still referring to FIG. 1, as illustrated in the callout section, mobile device 102 may include display device 106, user-facing image capture component 108, away-facing image capture component 109, one or more processors 114, storage 116, a network interface 118, and a peripheral interface 120, coupled with each other, via e.g., one or more communication buses 122.

Display 106 may be any one of a number of display technologies suitable for use on a mobile device. For example, display 106 may be a liquid crystal display (LCD), a thin-film transistor LCD, a plasma display, or the like. According to various embodiments, display 106 may be a touch sensitive display, i.e., a touchscreen. As a touchscreen, display 106 may be one of a number of types of touch screen, such as acoustic, capacitive, resistive, infrared, or the like.

User-facing image capture component 108 may be disposed on the mobile device 102 and oriented to face user 104. User-facing image capture component 108 may be configured to optically and/or electromagnetically capture images from a user-facing direction. User-facing image capture component 108 may be a complimentary metal oxide semiconductor (CMOS) image sensor, a charge-coupled device (CCD) image sensor, or one or more antennas configured to construct or create images in response to received electromagnetic signals.

Away-facing image capture component 109 may be configured as outward facing on the mobile device 102, i.e., oriented towards a direction opposite to user 104. Image capture component 109 may be configured to optically capture images from an outward facing direction. Image capture component 109 may be a complimentary metal oxide semiconductor (CMOS) image sensor, a charge-coupled device (CCD) image sensor, or one or more antennas configured to construct or create images in response to received electromagnetic signals.

One or more processors 114 (hereinafter processor 114) may be configured to determine changes in distance, position, or orientation of mobile device 102 with respect to user 104, based on images or data captured by user-facing image capture component 108. Processor 114 may determine changes in distance, position, or orientation of mobile device 102 by executing one or more instructions stored on storage 116. Processor 114 may be any one of a number of single or multi-core processors.

Storage 116 may be volatile memory, non-volatile memory, and/or a combination of volatile memory and non-volatile memory. Storage 116 may also include optical, electro-magnetic and/or solid state storage. Storage 116 may store a plurality of instructions which, when executed by processor 114, may cause mobile device 102 to capture images using image capture components 108 and 109; determine differences in distance d and/or orientation of mobile device 102 with respect to user 104; and adjust or change the visual output of display 106 as described earlier, in response to the determined changes in distance and/or orientation.

Network interface 118 may be configured to couple mobile device 102 to one or more networks. Network interface 118 may be a wireless local area network interface, such as a WiFi® interface in compliance with one of the IEEE 802.11 standards. (IEEE=Institute of Electrical and Electronics Engineers.) Network interface 118 may include a wireless wide area network interface, such as 3G or 4G telecommunication interface. (3G and 4G refer to the $3^{rd}$ and $4^{th}$ Generation of Mobil Telecommunication Standards as defined by International Telecommunication Union.)

Peripheral interface 120 may enable a variety of user interfaces, such as mice, keyboards, monitors, and/or audio commands. For example, peripheral interface 120 may enable USB ports, PS/2 ports, Firewire® ports, Bluetooth®, and the like, according to various embodiments.

Figure 2:
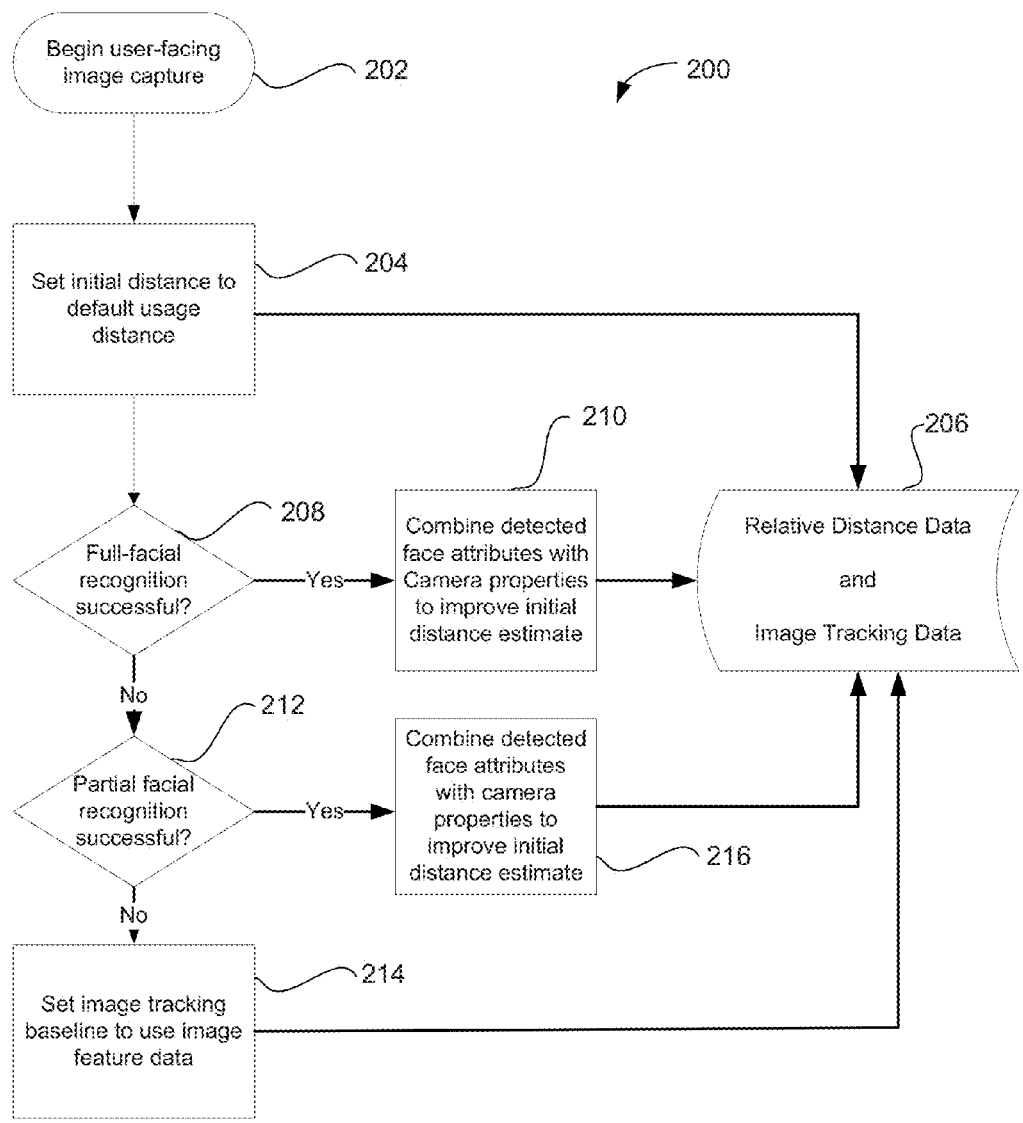
FIG. 2 illustrates a method of initializing a distance estimate function of the mobile device of FIG. 1.
Figure 3:
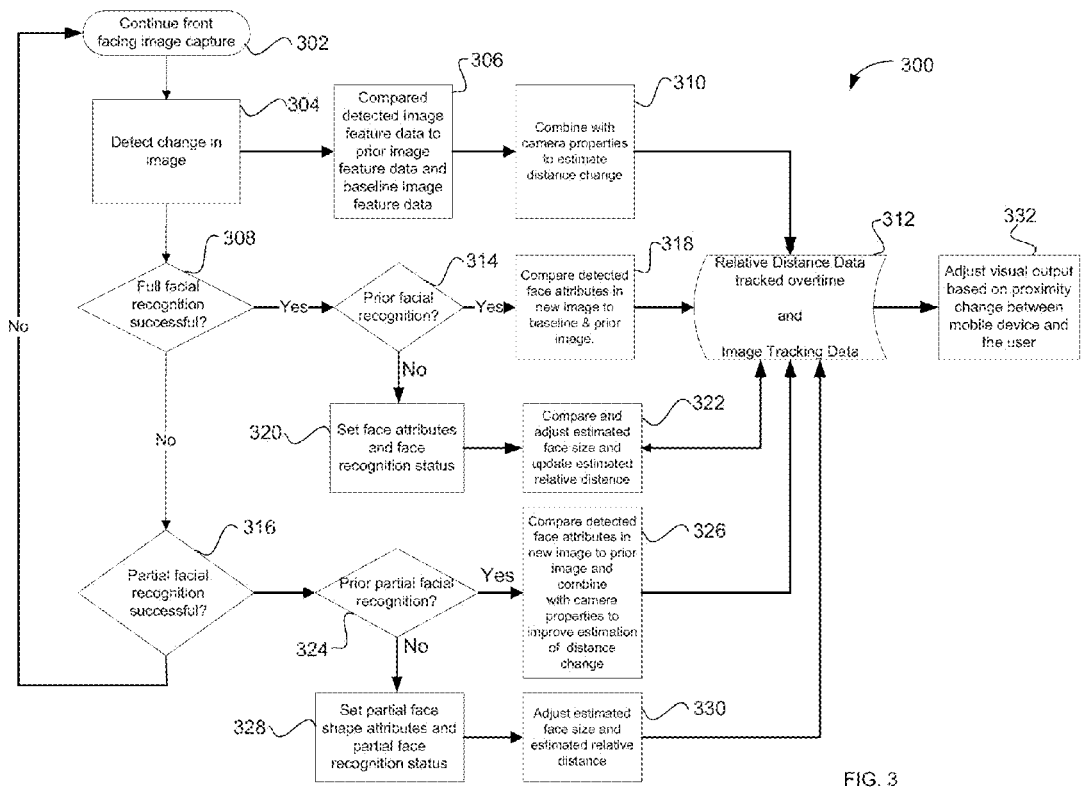
FIG. 3 illustrates a method of detecting a change in distance between a user and the mobile device of FIG. 1.
Figure 4:
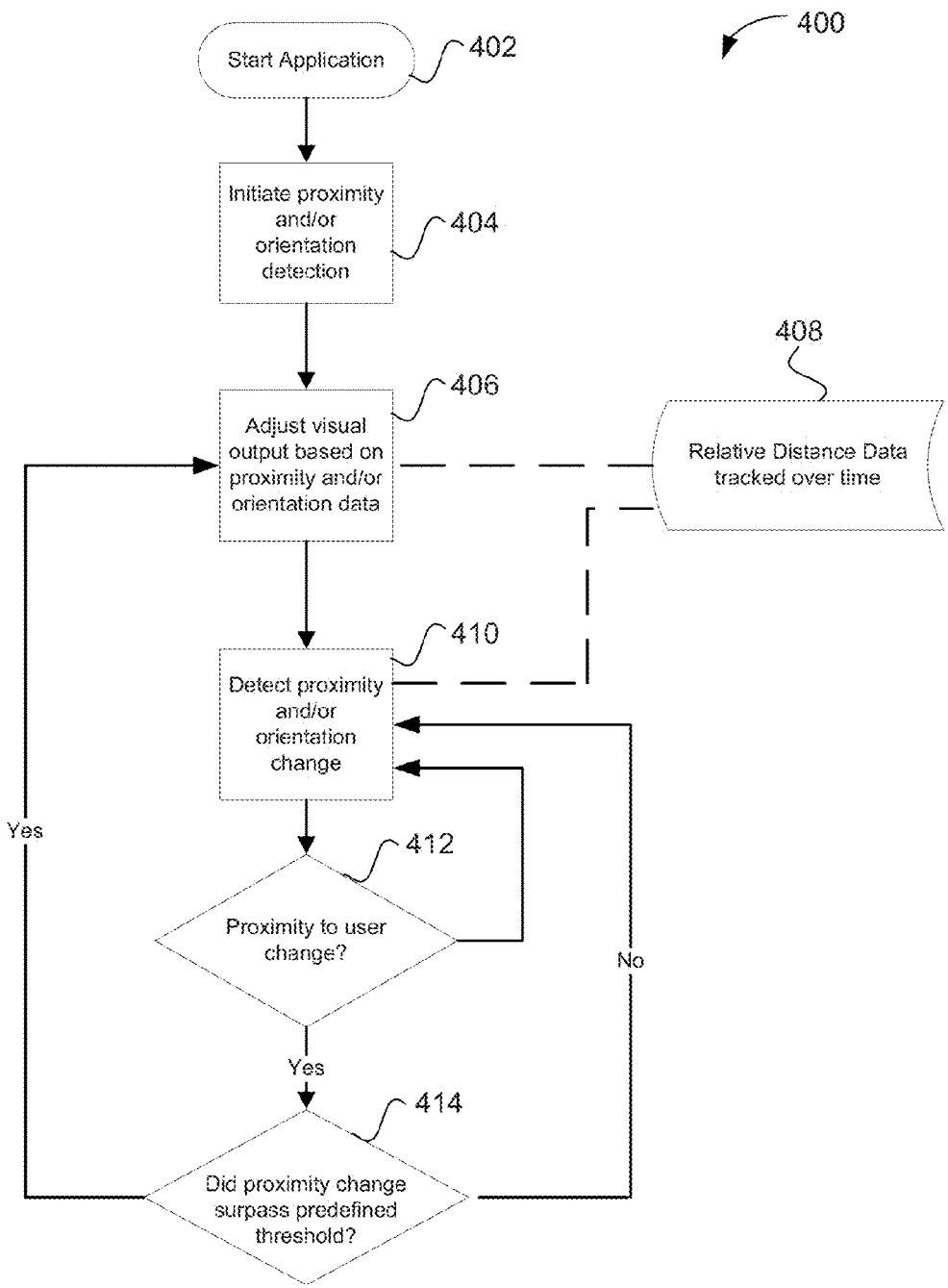
FIG. 4 illustrates a method of applying distance data acquired in FIGS. 2 and 3 to adapt a visual output of an application.

FIGS. 2-4 illustrate various methods for determining an initial distance between mobile device 102 and user 104, detecting a change in the distance between mobile device 102 and user 104, and applying the distance data to adapt visual output of an application, according to various embodiments of the disclosure.

FIG. 2 illustrates a method 200 of determining an initial distance between mobile device 102 and user 104, according to various embodiments.

At block 202, mobile device 102 may begin user-facing image capture. Mobile device 102 may use user-facing image capture component 108 to capture one or more images from the direction of user 104.

At block 204, mobile device 102 may set the initial distance between mobile device 102 and use 104 to equal a default or predetermined usage distance. The default usage distance may be a stored value that is based on previous data received during use of mobile device 102 by user 104. According to other embodiments, initial distance may be a value that is an estimated range of a distance at which a typical user may hold a mobile device during usage, for example 12 inches.

At block 206, a data repository of mobile device 102 may receive the initial distance determined at block 204 and mobile device 102 may retain relative distance data and image tracking data for future use or concurrent use by one or more applications executed by mobile device 102. According to embodiments, the data repository of mobile device 102 may be included in storage 116.

At block 208, mobile device 102 may determine if full facial recognition is successful. According to various embodiments, various software techniques may be utilized to perform facial recognition based on images captured at block 202. If full facial recognition is successful, method 200 may proceed to block 210. If full facial recognition is not successful, method 200 may proceed to block 212.

At block 210, mobile device 102 may combine the detected face attributes with camera properties to improve the initial distance estimate. For example, mobile device 102 may determine a current zoom level and exposure setting of user-facing image capture component 108 and may adjust the initial distance estimate based on a size of the face recognized at the current zoom level. Mobile device 102 may update the data repository of mobile device 102 with the improved initial distance.

At block 212, mobile device 102 may determine if partial facial recognition is successful. If partial facial recognition is not successful, method 200 may proceed to block 214. If partial facial recognition is successful, method 200 may proceed to block 216.

At block 214, mobile device 102 may set an image tracking baseline to use image feature data. In other words, mobile device 102 bases future image tracking on one or more shapes or features detected within the one or more images captured at block 202 in place of a face of a user. The image feature data may be provided to the data repository of mobile device 102.

At block 216, mobile device 102 may combine detected face attributes with camera properties to improve the initial distance estimate. According to embodiments, mobile device 102 may use camera properties such as a zoom level and/or an exposure level to improve initial distance estimates. Mobile device 102 may use improved initial distance estimates to update the data repository of mobile device 102.

FIG. 3 illustrates a method 300 of detecting a change in distance, position, or orientation of mobile device 102 with respect to user 104.

At block 302 mobile device 102 may continue front-facing image captures, e.g., by using user-facing image capture component 108.

At block 304, mobile device 102 may determine or detect if a change between previous images and a current image has occurred. Method 300 may then progress to block 306 and block 308.

At block 306 mobile device 102 may compare the detected image feature data to prior image feature data and to baseline image feature data.

At block 310, mobile device 102 may combine the changes in detected image feature data with camera properties to estimate a distance or orientation change. For example, mobile device 102 may determine whether previously detected image features have increased in size or decreased in size. Mobile device 102 may also determine if previously detected features have shifted up, down, left, or right within the images being analyzed. Mobile device 102 may then use the detected changes in image features to determine changes in distance, displacement, angle of view, or orientation of the mobile device 102 relative to user 104.

At block 312, mobile device 102 may update a data repository of mobile device 102 with relative distance data tracked over time and with image tracking data based on the estimated distance, displacement, or orientation change.

At block 308, mobile device 102 may determine if full-facial recognition is successful. If full facial recognition is successful, method 300 may proceed to block 314. If full facial recognition is not successful, method 300 may proceed to block 316.

At block 314, mobile device 102 may determined if prior full or partial face detection was successful. If prior full or partial facial recognition was successful, method 300 progresses to block 318. If prior facial recognition was not successful method 300 may proceed to block 320.

At block 318, mobile device 102 may compare detected facial attributes in the newly captured image to baseline images and to previously captured images. Based on the comparisons, mobile device 102 may update the data repository. Alternatively, based on the comparisons between current and previous detected facial attributes, mobile device 102 may determine a change in distance, position, and/or orientation of mobile device 102 with respect to user 104.

At block 320, mobile device 102 may set initial facial attributes and may update facial recognition status. For example, mobile device 102 may update facial recognition status to indicate that facial recognition was successful so that during subsequent image analysis mobile device 102 may attempt to determine distance, displacement, or orientation changes based on facial recognition.

At block 322, the device 102 may adjust the estimated face size and compare the estimated face size with previous images. Mobile device 102 may also update estimated relative distance between mobile device 102 and user 104 based on the estimated face size. Method 300 may update the data repository based on updates to the estimated relative distance.

At block 316, mobile device 102 may determine if partial facial recognition the successful. If partial facial recognition is not successful, mobile device 102 may continue capturing front facing images at block 302. If partial facial recognition is successful, method 300 may proceed to block 324.

At block 324, mobile device 102 may determine if prior partial facial recognition was successful. If prior partial facial recognition was successful, method 300 may proceed to block 326. If prior partial facial recognition was not successful, method 300 may proceed to block 328.

At block 326, mobile device 102 may combine detected facial attributes from a new image to the prior image(s). Mobile device 102 may determine a change in distance, displacement, and/or orientation of mobile device 102 based on the comparison. Mobile device 102 may combine differences in the compared facial attributes with properties of user-facing image capture component 108 to improve estimation of distance, displacement, and/or orientation change that was determined at block 310. Mobile device 102 may update the data repository based on the comparison of the partial facial recognition attributes.

At block 328, mobile device 102 may set partial face shape attributes and partial facial recognition status.

At block 330, mobile device 102 may adjust the estimated face size and adjust the estimated relative distance between mobile device 102 and user 104 based on the partial size and/or shape of the facial recognition. Mobile device 102 may update the data repository based on the adjustments to the estimated relative distance.

At block 332, mobile device 102 may adjust a visual output based on a proximity change between mobile device 102 and user 104. For example, if the mobile device 102 determines that user 104 has moved mobile device 102 up, down, left, or right along an x-axis or y-axis, mobile device 102 may adjust a visual output on display 106 by sliding or scrolling the visual output on display 106 in response to the repositioning of mobile device 102 by user 104.

FIG. 4 illustrates a method 400 of executing an application that may adjust a visual output based on position and/or orientation changes detected using images captured by the mobile device 102.

At block 402, mobile device 102 may start an application that may be adjusted based on positional changes of mobile device 102. An application that may be adjusted based on positional changes of mobile device 102 may include map-based applications, camera-based applications, spreadsheets, web pages, games, social networking tools, office productivity tools, remote device controls, or the like.

At block 404, mobile device 102 may initiate proximity and/or orientation detection of mobile device 102 with reference to user 104.

At block 406, mobile device 102 may provide distance and/or orientation change data obtained through the detection at block 404 to application to enable application to adjust a visual output on display 106 based on the proximity and/or orientation change data. Adjustments to the visual output may include changing settings of devices on mobile device 102, e.g., changing a zoom level of user-facing image capture component 108. Adjustments to the visual output may also include scrolling, rotating, and/or zooming the visual output of display 106. Before or while making adjustments, method 400 may receive and/or consider relative distance data tracked over time that may be stored in a data repository of mobile device 102, as represented by block 408.

At block 410, mobile device 102 may detect additional proximity and/or orientation change of mobile device 102 with respect to user 104. The method 400 may receive relative distance data tracked over time from a data repository of mobile device 102, as shown in block 408.

At block 412, mobile device 102 may determine if proximity of mobile device 102 to user 104 changed. In other embodiments, mobile device 102 may determine at block 412 if an orientation of mobile device 102 with reference to user 104 changed. If neither proximity nor orientation of mobile device 102 to user 104 has changed, method 400 may return to block 410. If proximity or orientation of mobile device 102 to user 104 has changed, method 400 may proceed to block 414.

At block 414, mobile device 102 may determine if the proximity or orientation change of block 412 surpasses a predefined threshold. If the proximity or orientation change surpasses the predefined threshold, mobile device 102 may return to block 406. If neither the proximity nor the orientation change surpasses the predefined threshold, method 400 may return to block 410.

Figure 5:
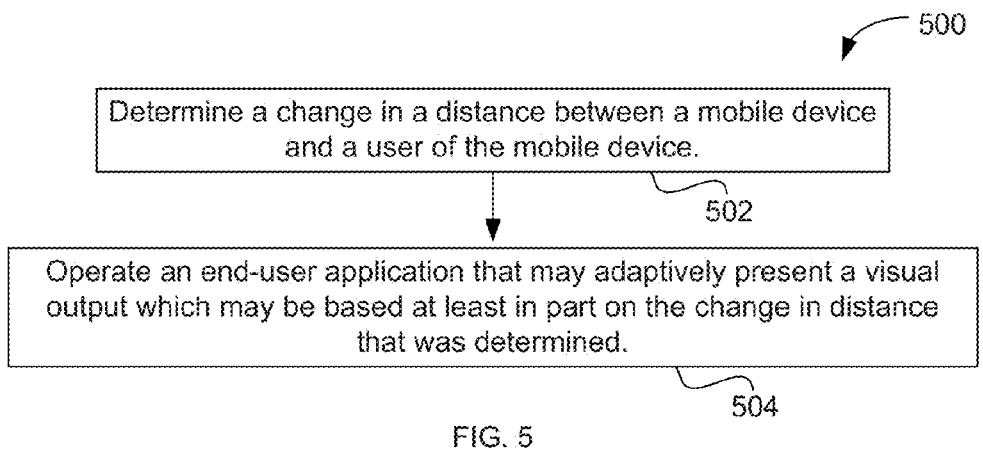
FIG. 5 illustrates a method of operating an adaptive application in the mobile device of FIG. 1.

FIG. 5 illustrates a method 500 of operating an adaptive application in mobile device 102, according to various embodiments. At block 502, mobile device 102 may determine the change in distance between mobile device 102 and user 104. The mobile device 102 may use any one of a variety of techniques to determine the change in distance. For example, mobile device may determine differences in images based on image features, based on full facial recognition, and/or based on partial facial recognition.

In block 504, mobile device 102 may operate an end-user application that may adaptively present a visual output which may be based at least in part on the change in distance that was determined in block 502. As described above, and according to various embodiments, end-user applications may include maps, games, social networking tools, spreadsheets, productivity applications, and the like. Adaptively presenting a visual output may include zooming in, zooming out, scrolling, and or changing a parallax view point of a 3D simulation displayed on display 106.

While operating an end-user application, mobile device 102 may be configured to customize changes made to the visual output based on specific interactions by a user with mobile device 102. For example, an end-user application may manipulate the zoom level of an outward oriented camera of mobile device 102. While a user is moving mobile device 102 away from the user, mobile device 102 may be configured to concurrently decrease a zoom level of the outward oriented camera. If a user continues moving mobile device 102 away from the user, it is possible that the user may want mobile device 102 to continue decrease the zoom level of the outward oriented camera. However, since operation of the zoom function is dependent upon a length of the user's arms, the user may be unable to continue moving mobile device 102 away from the user. According to one embodiment, mobile device 102 may continue decreasing a zoom level of the outward oriented camera even after a user stops moving mobile device 102 away from the user. Mobile device 102 may be configured to stop decreasing a zoom level of the outward oriented camera either when a minimum zoom level is reached or when the user moves mobile device 102 towards the user. In one embodiment, mobile device 102 may be configured to stop decreasing the zoom level of the camera in response to the user abruptly or rapidly moving mobile device 102 towards the user. In other embodiments, the user may quickly or slowly move mobile device 102 towards the user to stop decreasing the zoom level.

Mobile device 102 may be configured to determine a length of a user's arm based on the user moving mobile device 102 back towards the user in order to stop decreasing the zoom level. Mobile device 102 may be configured to store an estimated length of the user's arm in storage 116 for future use or reference. Mobile device 102 may then use the user's estimated arm length, in combination with a full zoom range of the outward oriented camera, to calibrate or adjust a zoom per distance resolution of the camera.

According to embodiments, mobile device 102 may be configured to similarly continue increasing a zoom level of the outward oriented camera even after a user has stopped moving mobile device 102 towards the user. If the user does not want to bring mobile device 102 closer to the user or if the user cannot bring mobile device 102 closer to the user while the outward oriented camera is still capable of increasing a zoom level, then mobile device 102 may be configured to continue to increase the zoom level of the outward oriented camera until the user moves mobile device 102 away from the user.

According to other embodiments, mobile device 102 may be configured to dynamically adjust a zoom per distance resolution of the outward oriented camera while the user moves mobile device 102 closer to the user or farther from the user. For example, while a user is moving mobile device 102 away from the user, mobile device 102 may be configured to determine a remaining zoom capability or capacity of the outward oriented camera. As the user moves mobile device 102 towards a zoom limit of the outward oriented camera, mobile device 102 may be configured to slow the rate by which the zoom level of the outward oriented camera changes by dynamically decreasing the zoom per distance resolution of the outward oriented camera. Mobile device 102 may then store the adjusted zoom per distance resolution for future use.

According to embodiments, range limitations of zoom level for the outward oriented camera may be calibrated during each use of mobile device 102 by a user.

According to other embodiments, mobile device 102 may store a different zoom per distance resolution and range limitations, e.g., user arm length, for each user of mobile device 102. Mobile device 102 may associate zoom and range settings with user accounts and may enable a user to select an account with which to use mobile device 102.

Figure 6:
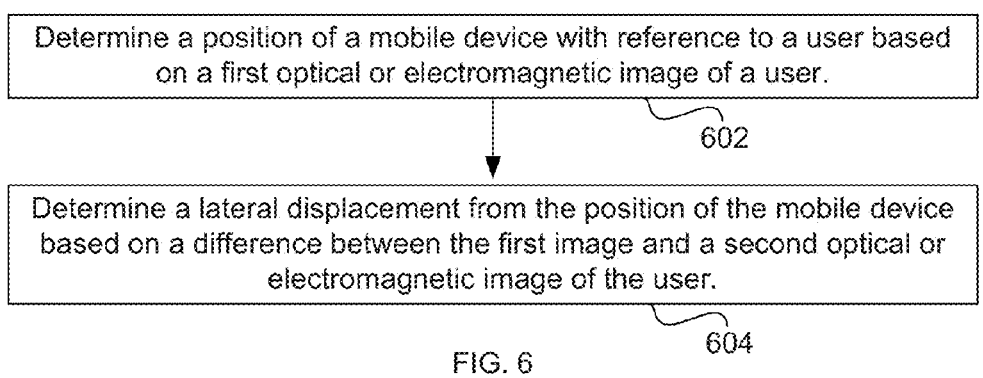
FIG. 6 illustrates another method of operating an adaptive application in the mobile device of FIG. 1.

FIG. 6 illustrates a method 600 of operating an adaptive application in mobile device 102, according to embodiments.

At block 602, mobile device 102 may determine a position of the mobile device with reference to a user, based on a first optical or electromagnetic image of the user.

At block 604, mobile device 102 may determine a lateral displacement from the position of mobile device 102 based on a difference between the first image and a second optical or electromagnetic image of the user. Mobile device 102 may provide the lateral displacement information to the application to enable the application to adjust or change a visual output on display 106 based on the determined lateral displacement. For example, the application may scroll, change, zoom, and/or reorient visual output based on the determined lateral displacement.

Figure 7:
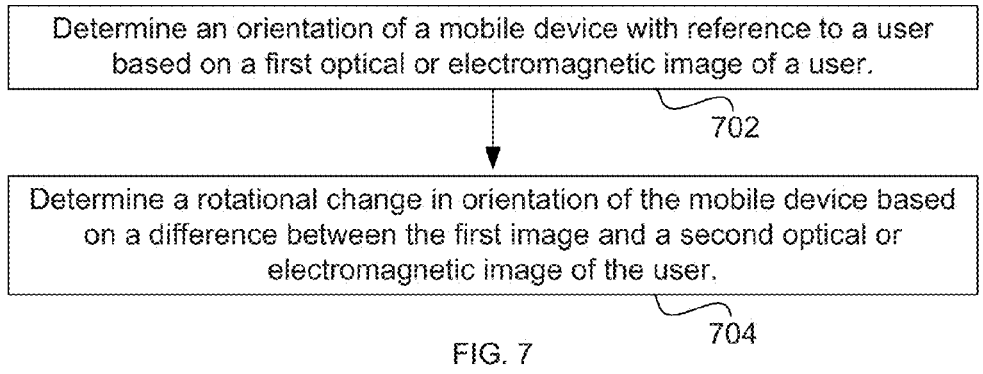
FIG. 7 illustrates still another method of operating an adaptive application in the mobile device of FIG. 1.

FIG. 7 illustrates a method 700 of operating an adaptive application in mobile device 102, according to various embodiments.

At block 702, mobile device 102 may determine an orientation of mobile device 102 with reference to a user, based on a first optical or electromagnetic image of the user.

At block 702, mobile device 102 may determine a rotational change in orientation of mobile device 102 based on a difference between the first image and a second optical or electromagnetic image of the user. For example, the user may rotate mobile device 102 along the x-axis 110 or along a y-axis 112 during use. According to embodiments, mobile device 102 may be configured to provide the orientation change data to the application to enable the application to adjust, change, scroll, zoom, and/or reorient a visual output of display 106 based on the determined rotational changes in orientation of mobile device 102.

Figure 8:
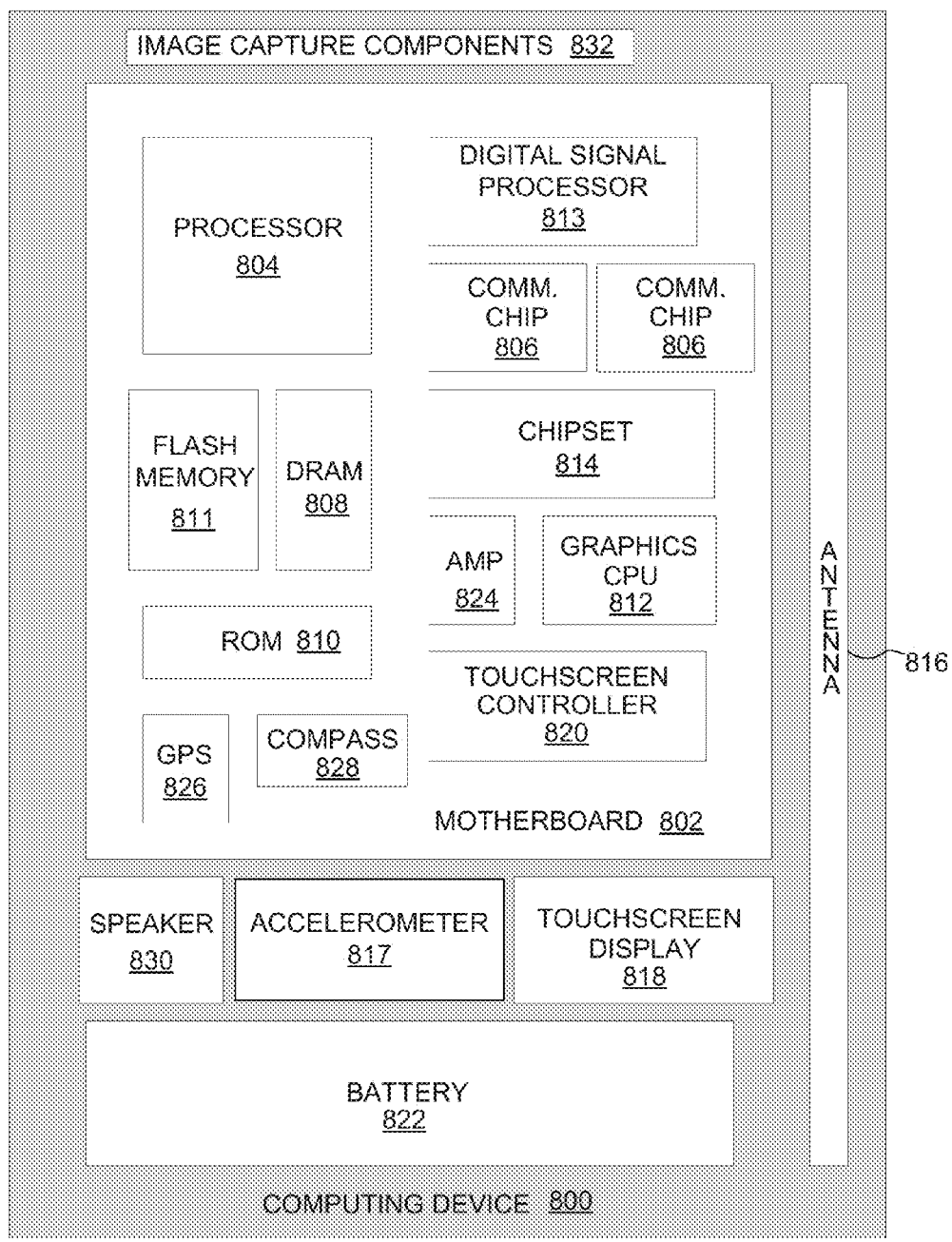
FIG. 8 illustrates an example of a mobile device of FIG. 1; all arranged in accordance with embodiments of the present disclosure.

FIG. 8 illustrates a computing device 800 in accordance with one implementation of an embodiment of the invention. Depending on the actual components included, computing device 800 may be suitable for use as mobile device 102 of FIGS. 1A and 1B. In embodiments, computing device 800 may house a motherboard 802. The motherboard 802 may include a number of components, including but not limited to a processor 804 and at least one communication chip 806. The processor 804 may be physically and electrically coupled to motherboard 802. In some implementations the at least one communication chip 806 may also be physically and electrically coupled to motherboard 802. In further implementations, the communication chip 806 may be part of the processor 804. In alternate embodiments, the above enumerated may be coupled together in alternate manners without employment of motherboard 802.

Depending on its applications, computing device 800 may include other components that may or may not be physically and electrically coupled to motherboard 802. These other components include, but are not limited to, volatile memory (e.g., DRAM 808), non-volatile memory (e.g., ROM 810), flash memory 811, a graphics processor 812, a digital signal processor 813, a crypto processor (not shown), a chipset 814, an antenna 816, a display (not shown), a touchscreen display 818, a touchscreen controller 820, a battery 822, an audio codec (not shown), a video codec (not shown), a power amplifier 824, a global positioning system (GPS) device 826, a compass 828, an accelerometer, a gyroscope, a speaker 830, user and away facing optical or electromagnetic image capture components 832, and a mass storage device (such as hard disk drive, compact disk (CD), digital versatile disk (DVD), and so forth).

In various embodiments, volatile memory (e.g., DRAM 808), non-volatile memory (e.g., ROM 810), and/or flash memory 811, may include instructions to be executed by processor 804, graphics processor 812, digital signal processor 813, and/or crypto processor, to practice various aspects of the methods and apparatuses described earlier with references to FIGS. 2-7 on mobile devices 102 and/or computing device 800.

The communication chip 806 may enable wired and/or wireless communications for the transfer of data to and from the computing device 800 through one or more networks. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

The processor 804 of the computing device 800 may include an integrated circuit die packaged within the processor 804. The term "processor" may refer to any device or portion of a device (e.g., a processor core) that processes electronic data from registers and/or memory to transform that electronic data into other electronic data that may be stored in registers and/or memory.

The communication chip 806 also includes an integrated circuit die packaged within the communication chip 806.

In further implementations, another component housed within the computing device 800 may contain an integrated circuit die that includes one or more devices, such as processor cores, cache and one or more memory controllers.

In various implementations, the computing device 800 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, an entertainment control unit, a digital camera, a portable music player, or a digital video recorder. In further implementations, the computing device 800 may be any other electronic device that processes data.

According to various embodiments, one or more computer-readable media may have instructions configured to, in response to execution of the instructions by a mobile device, enable the mobile device to determine a change in a distance between the mobile device and a user of the mobile device. The instructions may be configured to enable the mobile device to operate an end-user application that adaptively presents a visual output based at least in part on a result of the change in the distance that was determined The instructions may be configured to capture one or more first images from a user-facing optical or electromagnetic image capturing component disposed on the mobile device, and, based on the one or more first images, approximate the distance between the mobile device to a user.

According to embodiments, the instructions that may be configured to enable the mobile device to determine the change in the distance may further include capture one or more second images from the user-facing optical or electromagnetic image capturing component; and, based on differences between the one or more first images and the one or more second images, determine the change in the distance between the mobile device and the user. The instructions that may be configured to enable the mobile device to determine the change in the distance may further include determine the change in the distance by one of a device driver, a system service, or an application on the mobile device. The instructions that may be configured to enable the mobile device to operate the end-user application may further include change a zoom level of the visual output of the end-user application. The end-user application may be a map.

In embodiments, the end-user application may be a camera application associated with a camera disposed on the mobile device. The instructions that may be configured to enable the mobile device to operate the end-user application may further include instructions to change a zoom level of the camera application or the camera in response to the change in the distance that was determined The instructions that may be configured to enable the mobile device to determine the change in the distance may include instruction to determine a user-specific maximum of the distance between the mobile device and the user, based on the change in the distance; and determine a user-specific minimum of the distance between the mobile device and the user, based on the change in the distance. The instructions may be further configured to enable the mobile device to calibrate a zoom per distance resolution for the camera application based on at least one of the maximum and the minimum of the distance. Instructions to enable the mobile device to calibrate the zoom per distance resolution may include instructions to determine if a maximum zoom of the camera application or the camera will occur before the user-specific maximum of the distance will occur during a displacement of the mobile device; adjust the zoom per distance resolution if the maximum zoom will occur before the user-specific maximum of the distance will occur; and save the adjusted zoom per distance resolution to an account for the user. The instructions may be further configured to enable the mobile device to discontinue change of the zoom level of the camera application or the camera if the mobile device is moved in a direction that is opposite to a direction associated with the change in the distance; or discontinue change of the zoom level of the camera application or the camera if a maximum or a minimum of the camera application is reached.

According to embodiments, the instructions may be further configured to enable the mobile device to identify the user based on partial or full facial recognition. The instructions may be further configured to enable the mobile device to load user-specific settings for the visual output of the end-user application based on the partial or full facial recognition.

According to various embodiments, one or more computer-readable media may have instructions that may be configured to, in response to execution of the instructions by a mobile device, enable the mobile device to determine a position of the mobile device with reference to a user based on a first optical or electromagnetic image of the user, determine a lateral displacement from the position of the mobile device based on a difference between the first image and a second optical or electromagnetic image of the user, and operate an end-user application that adaptively presents a visual output based at least in part on a result of the lateral displacement that was determined Instructions to operate the end-user application may include adjust the visual output in response to the lateral displacement. The instructions may be further configured to enable the mobile device to adjust the visual output to scroll up, down, left, and right in response to the lateral displacement from the position that is down, up, right, and left, respectively. The instructions may be configured to enable the mobile device to adjust the visual output to vary a parallax viewpoint of a 3-dimensional simulation represented by the visual output.

According to various embodiments, one or more computer-readable media may have instructions that may be configured to, in response to execution of the instructions by a mobile device, enable the mobile device to approximate an axis-based orientation of the mobile device with reference to the user based on a first optical or electromagnetic image, determine a change in the axis-based orientation of the mobile device based on a second optical or electromagnetic image, and operate an end-user application that adaptively presents a visual output based at least in part on a result of the change in the axis-based orientation that was determined Instructions to operate the end-user application may include adjust the visual output in response to the change in the axis based orientation. The axis-based orientation may include a tilt of the mobile device around one or more of an x-axis of the mobile device or a y-axis of the mobile device. The instructions may be further configured to enable the mobile device to adjust the visual output of the end-user application to vary a parallax viewpoint of a 3-dimensional simulation represented by the visual output.

According to various embodiments, a method may include determining, by a mobile device, a change in a distance between the mobile device and a user of the mobile device; and operating, by the mobile device, an end-user application that adaptively presents a visual output based at least in part on a result of the change in the distance that was determined. Determining the change in the distance may include capturing a first image and a second image from a user-facing optical or electromagnetic image capturing component disposed on the mobile device; and determining the change in the distance based on differences between the first image and the second image.

The method may further include adjusting a zoom level of the image capturing component or the visual output of the end-user application based on the change in the distance. The change in the distance may be a positive change in a first distance in a first direction. Adjusting the zoom level of the image capturing component or the visual output of the end-user application may include adjusting the zoom level until the mobile device determines a negative change in a second distance that is in a second direction that is opposite the first direction. Determining the change in the distance may include determining based on full or partial facial recognition. In embodiments, operating the end-user application may include recalibrating a zoom level of the end-user application or of an image capturing component disposed on the mobile device, based on the change in the distance.

According to various embodiments, a mobile system may include a housing configured to carry one or more electronic circuits, a display coupled to the housing and configured to display a visual output of an end-user application, and a user-facing image capture component disposed on the housing. The mobile system may include memory carried by the housing and configured to store a number of instructions; and one or more processors coupled to the display and to the memory. The one or more processors may be configured, in response to execution of the instructions, to determine a change in a distance between the mobile device and a user of the mobile device; and to operate an end-user application that adaptively presents a visual output based at least in part on a result of the change in the distance that was determined. The one or more processors may be configured to adjust a zoom level of the visual output or the image capture component in response to the change in the distance. The one or more processors may be further configured to, in response to execution of the instructions, determine the change in the distance based on full or partial facial recognition. The mobile system may be one of a smart phone, tablet computing device, laptop, netbook, and personal digital assistant.

According to various embodiments, each of the features described for each of the computer readable media, methods, and apparatus may be combined with other features of each of the computer readable media, methods, and apparatuses.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims.

What is claimed is:

1. One or more non-transitory computer-readable media having instructions that, in response to execution by a mobile device, cause the mobile device to:
   determine a first change in distance between the mobile device and a user of the mobile device;
   operate a camera application associated with a camera coupled with the mobile device that adaptively presents a visual output based at least in part on the first change in distance, wherein to operate the camera application includes recalibrating a zoom level of the camera application based at least in part on the first change in distance;
   determine a user-specific maximum distance between the mobile device and the user, based on a second change in distance;
   determine a user-specific minimum distance between the mobile device and the user, based on the second change in distance;
   calibrate a zoom per distance resolution for the camera application based on at least one of the maximum or the minimum distance; and
   operate the camera application to change a zoom level of the camera application or to cause a change to a zoom level of the camera based on the second change in distance.

2. The one or more computer-readable media of claim 1, wherein calibrate the zoom per distance resolution includes:
   determine that a maximum zoom of the camera application or the camera will occur before the user-specific maximum distance will occur during a displacement of the mobile device;
   adjust the zoom per distance resolution, in response to the determination that the maximum zoom will occur before the user-specific maximum distance will occur; and
   save the adjusted zoom per distance resolution to an account for the user.

3. The one or more computer-readable media of claim 1, wherein the instructions are further configured to:
   discontinue change of the zoom level of the camera application or the camera in response to movement of the mobile device in a direction that is opposite to a direction associated with the second change in distance; or
   discontinue change of the zoom level of the camera application or the camera in response to reaching a maximum zoom level or a minimum zoom level of the camera application or the camera.

4. A method comprising:
   determining, by a mobile device, a first change in distance between the mobile device and a user of the mobile device;
   operating, by the mobile device, a camera application associated with a camera coupled with the mobile device that adaptively presents a visual output based at least in part on the first change in distance, wherein to operate the camera application includes recalibrating a zoom level of the camera application based at least in part on the first change in distance;

determining, by the mobile device, a user-specific maximum distance between the mobile device and the user, based on a second change in distance;

determining, by the mobile device, a user-specific minimum distance between the mobile device and the user, based on the second change in distance;

calibrating, by the mobile device, a zoom per distance resolution for the camera application based on at least one of the maximum or the minimum distance; and operating, by the mobile device, the camera application to change a zoom level of the camera application or to cause a change to a zoom level of the camera based on the second change in distance.

5. The method of claim 4, wherein calibrating the zoom per distance resolution includes:

determining, by the mobile device, that a maximum zoom of the camera application or the camera will occur before the user-specific maximum distance will occur during a displacement of the mobile device;

adjusting, by the mobile device, the zoom per distance resolution, in response to the determination that the maximum zoom will occur before the user-specific maximum distance will occur; and saving, by the mobile device, the adjusted zoom per distance resolution to an account for the user.

6. The method of claim 5, further comprising:

discontinuing, by the mobile device, change of the zoom level of the camera application or the camera in response to movement of the mobile device in a direction that is opposite to a direction associated with the second change in distance; or discontinuing, by the mobile device, change of the zoom level of the camera application or the camera in response to reaching a maximum zoom level or a minimum zoom level of the camera application or the camera.

7. An apparatus comprising:

means for determining a first change in distance between a mobile device and a user of the mobile device;

means for operating a camera application associated with a camera coupled with the mobile device that adaptively presents a visual output based at least in part on the first change in distance, wherein to operate the camera application includes recalibrating a zoom level of the camera application based at least in part on the first change in distance;

means for determining a user-specific maximum distance between the mobile device and the user, based on a second change in distance;

means for determining a user-specific minimum distance between the mobile device and the user, based on the second change in distance;

means for calibrating a zoom per distance resolution for the camera application based on at least one of the maximum or the minimum distance; and means for operating the camera application to change a zoom level of the camera application or to cause a change to a zoom level of the camera based on the second change in distance.

8. The apparatus of claim 7, wherein calibrating the zoom per distance resolution includes:

means for determining that a maximum zoom of the camera application or the camera will occur before the user-specific maximum distance will occur during a displacement of the mobile device;

means for adjusting the zoom per distance resolution, in response to the determination that the maximum zoom will occur before the user-specific maximum distance will occur; and means for saving the adjusted zoom per distance resolution to an account for the user.

9. The apparatus of claim 8, further comprising:

means for discontinuing change of the zoom level of the camera application or the camera in response to movement of the mobile device in a direction that is opposite to a direction associated with the second change in distance; or means for discontinuing change of the zoom level of the camera application or the camera in response to reaching a maximum zoom level or a minimum zoom level of the camera application or the camera.

* * * * *